US007781684B2

(12) United States Patent
Stuckmann et al.

(10) Patent No.: US 7,781,684 B2
(45) Date of Patent: Aug. 24, 2010

(54) INSULATING GASKET MEANS FOR SUPPORTING A CABLE IN A HOUSING OPENING

(75) Inventors: Peter Stuckmann, Lage (DE); Uwe Arlitt, Leopoldshoehe (DE); Paulo Russo, Lage (DE); John Witt, Detmold (DE); Günter Lucht, Horn-Bad Meinberg (DE); Joachim Bury, Herford (DE); Thomas Salomon, Guetersloh (DE); Torsten Diekmann, Leopoldshoehe (DE); Andreas Wedler, Detmold (DE); Thomas Pieper, Geseke (DE)

(73) Assignee: Weidmuller Interface GmbH & Co. KG, Detmold (DE)

( * ) Notice: Subject to any disclaimer, the term of this patent is extended or adjusted under 35 U.S.C. 154(b) by 826 days.

(21) Appl. No.: 11/711,209

(22) Filed: Feb. 27, 2007

(65) Prior Publication Data
US 2007/0216110 A1 Sep. 20, 2007

(30) Foreign Application Priority Data

Mar. 18, 2006 (DE) .................... 20 2006 004 314 U
Nov. 21, 2006 (DE) .................... 20 2006 017 659 U (51) Int. Cl.
*H02G 3/18* (2006.01)
*F16L 5/02* (2006.01)

(52) U.S. Cl. .................... 174/650; 174/652; 174/152 G; 174/153 G; 16/2.1; 16/2.2; 277/607; 277/603

(58) Field of Classification Search ............. 174/17 CT, 174/50, 650, 652, 151, 156, 137 R, 135, 152 G, 174/153 G, 152 R, 77 R, 72 A, 657, 656; 16/2.1, 2.2; 277/607, 603, 627, 314, 330, 277/608, 625; 248/56
See application file for complete search history.

(56) References Cited

U.S. PATENT DOCUMENTS 3,161,906 A * 12/1964 Yarm ............................ 16/2.1

(Continued)

FOREIGN PATENT DOCUMENTS

DE 197 01 511 A1 7/1997

(Continued)

*Primary Examiner*—Angel R Estrada
(74) *Attorney, Agent, or Firm*—Lawrence E. Laubscher, Sr.; Lawrence E. Laubscher, Jr.

(57) ABSTRACT

A compressible sealing gasket for supporting a cable in a wall opening contained in a housing wall includes a pair of gasket sections each having a planar surface that contains a recess, and at least one integral compressible sealing projection extending from the planar surface adjacent the recess. When the gasket sections are placed in an assembled condition with their planar surfaces in contiguous engagement, the recesses cooperate to define a cable opening for receiving a cable, and the projection is compressed between the gasket sections to seal the space between the gasket sections adjacent the cable opening. Preferably two laterally spaced integral sealing ribs are provided in each recess, which sealing ribs extend transversely completely across the recess and terminate at each end in a sealing projection that extends upwardly from the associated planar surface.

18 Claims, 8 Drawing Sheets

U.S. PATENT DOCUMENTS

| | | | | |
|---|---|---|---|---|
| 3,836,269 A | * | 9/1974 | Koscik | 16/2.2 |
| 4,517,408 A | * | 5/1985 | Pegram | 174/153 G |
| 4,702,444 A | * | 10/1987 | Beele | 248/56 |
| 4,919,372 A | * | 4/1990 | Twist et al. | 248/56 |
| 6,211,465 B1 | * | 4/2001 | Streit | 16/2.1 |
| 6,521,840 B1 | * | 2/2003 | Kreutz | 277/603 |
| 6,590,160 B1 | | 7/2003 | Döpfl | |
| 6,623,303 B2 | | 9/2003 | Syed et al. | |
| 6,717,055 B2 | * | 4/2004 | Kato | 174/72 A |
| 7,005,579 B2 | * | 2/2006 | Beele | 174/152 G |
| 7,049,515 B1 | * | 5/2006 | Collins et al. | 174/153 G |
| 7,355,130 B2 | * | 4/2008 | Holman et al. | 174/153 G |
| 7,371,969 B2 | * | 5/2008 | Hedstrom | 174/151 |

FOREIGN PATENT DOCUMENTS

| | | |
|---|---|---|
| DE | 103 49 440 A1 | 6/2005 |
| DE | 10 2004 040 661 A | 3/2006 |

* cited by examiner

FIG.8c ial # US 7,781,684 B2

INSULATING GASKET MEANS FOR SUPPORTING A CABLE IN A HOUSING OPENING

BACKGROUND OF THE INVENTION

1. Field of the Invention

Compressible sealing gasket means are provided for supporting a cable in a wall opening contained in a housing wall, including a pair of gasket sections each having a planar surface that contains a recess, and at least one integral compressible sealing projection extending from the planar surface adjacent the recess. When the gasket sections are placed with their planar surfaces in contiguous engagement, the recesses cooperate to define in the gasket a cable opening for receiving the cable, the projection being compressed between the gasket sections to seal the space between the gasket sections adjacent the cable opening. Preferably two spaced integral sealing ribs are provided in each recess, which sealing ribs extend transversely completely across the recess and terminate at each end in a sealing projection that extends upwardly from the associated planar surface.

2. Description of Related Art

It is known in the prior art to provide sectional sealing gaskets for sealing housing openings through which extends an electrical cable or conduit. One disadvantage to the known gasket devices is that occasionally leakages develop along the inside circumference of the annular seals in the part of the system adjacent the cable.

The present invention was developed to solve this problem. To this end, two gasket sections are provided having planar surfaces containing recesses, together with integral projections extending from the planar surfaces adjacent the recesses. When the gasket sections are assembled with the planar faces in contiguous engagement, the projections are compressed and counteract in a simple manner to prevent the formation of a gap along the inside circumference, thereby to alleviate the cause of a major portion of the sealing problems along the inside circumference of the divided seal because the projections bridge the area in which a gap could be formed between the sealing segments.

It is particularly advantageous when the projections are made generally in the area of at least one sealing rib in such a manner that they will not extend axially and/or also radially over the entire area of the sealing segments. In this way, the sealing effect is optimized in a particularly targeted location relative to the inside circumference of the cable opening.

SUMMARY OF THE INVENTION

Accordingly, a primary object of the present invention is to provide an improved sealing gasket for cables, including a pair of generally rectangular gasket sections formed of a compressible material and having planar surfaces that contain transverse recesses extending completely thereacross, which sections include integral compressible projections that extend from the planar surfaces adjacent the recesses, whereby when the sections are assembled together with their planar surfaces in contiguous engagement, the recesses cooperate to define an opening for receiving a cable-supporting gasket, and the projections on opposite sides of the recesses are compressed to seal the spaces between the gasket sections adjacent the gasket opening.

According to another object of the invention, at least two integral sealing ribs extend transversely continuously across each recess, each sealing rib terminating in the aforementioned sealing projections that extend from the planar surfaces. Thus, when the cable is supported within the gasket opening and the gasket sections are in the assembled condition, the sealing ribs and the sealing projections are both compressed to seal the space around the cable circumference. The gasket opening may have a circular cross-sectional configuration for receiving a round cable, or an elliptical configuration for receiving a flat or oval cable.

According to a more specific object of the invention, the sealing gasket and cable assembly is mounted in a wall opening contained in the side wall of a rigid housing containing a chamber, the circumferential surface of the wall opening containing a continuous groove that defines a pair of spaced wall flange portions that respectively extend within corresponding sealing grooves contained in the outer circumference of the sealing gasket, thereby sealing the space between the sealing gasket and the housing wall opening.

Another object of the invention is to provide hinge means connecting the gasket sections for relative displacement between a disassembled condition permitting the cable to be introduced laterally into one recess, and an assembled condition in which the planar surfaces of the sections are in contiguous engagement and the cable is received in both recesses, thereby to compress the sealing projections that extend between the sections. Fastening pin and bore means may be provided for locking the sections together when in the assembled condition.

BRIEF DESCRIPTION OF THE DRAWINGS

Other objects and advantages of the invention will become apparent from a study of the following specification, when viewed in the light of the accompanying drawing, in which:

FIG. 6b is a detailed view a portion of the sealing gasket of FIG. 6a;

FIG. 8c is a detailed sectional view of the sealing gasket of FIG. 8a.

DETAILED DESCRIPTION OF THE INVENTION

Figure 1:
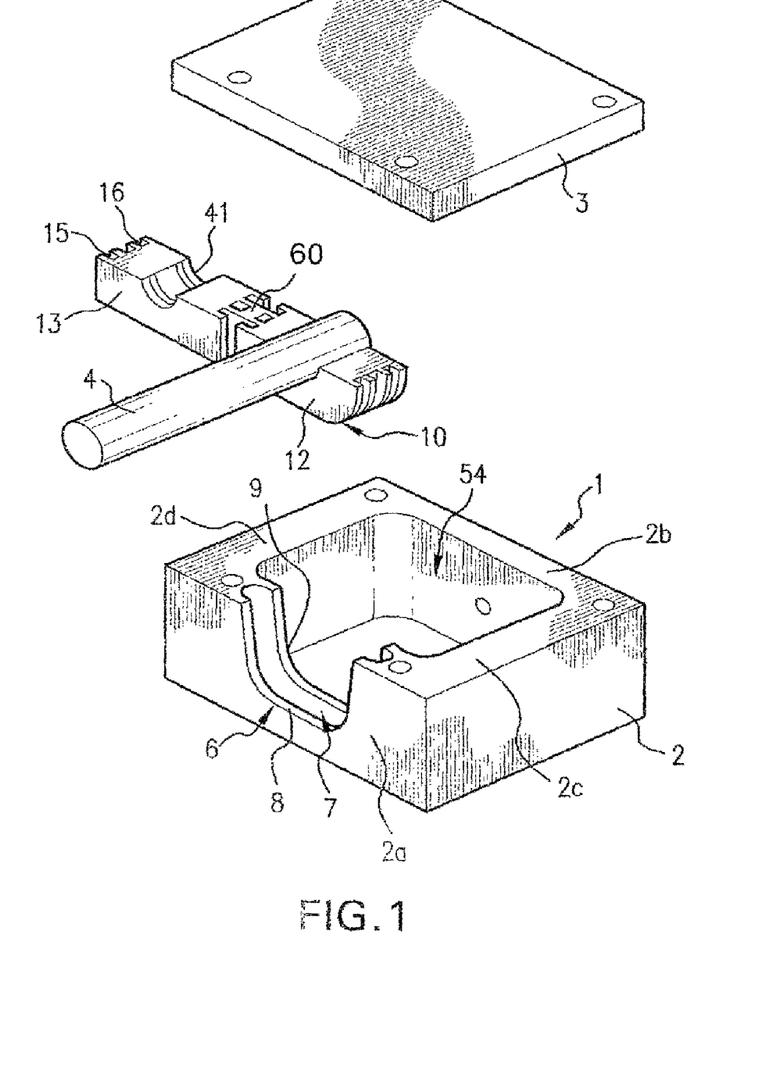
FIG. 1 is an exploded perspective view of a housing, sealing gasket and cable assembly.
Figure 2:
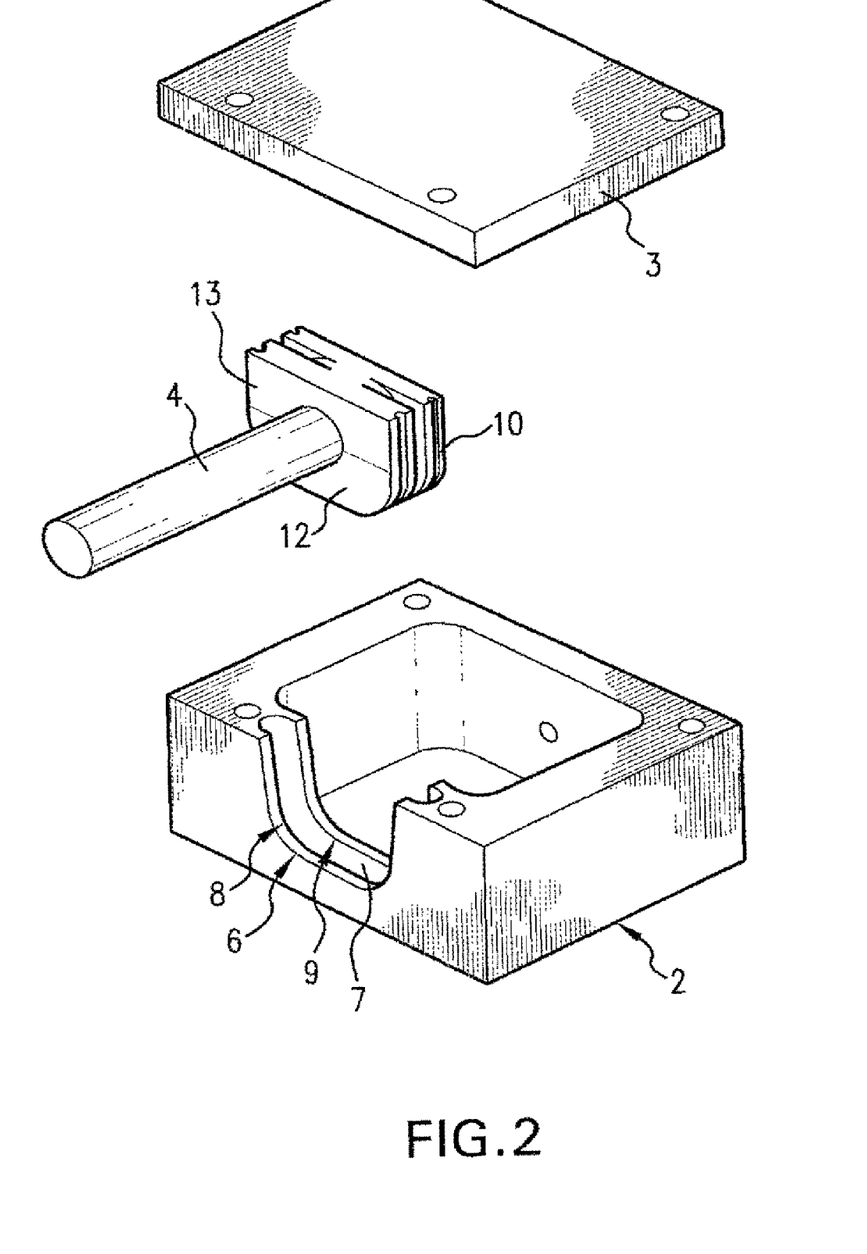
FIG. 2 is a corresponding view with the sealing gasket in the assembled condition.
Figure 3:
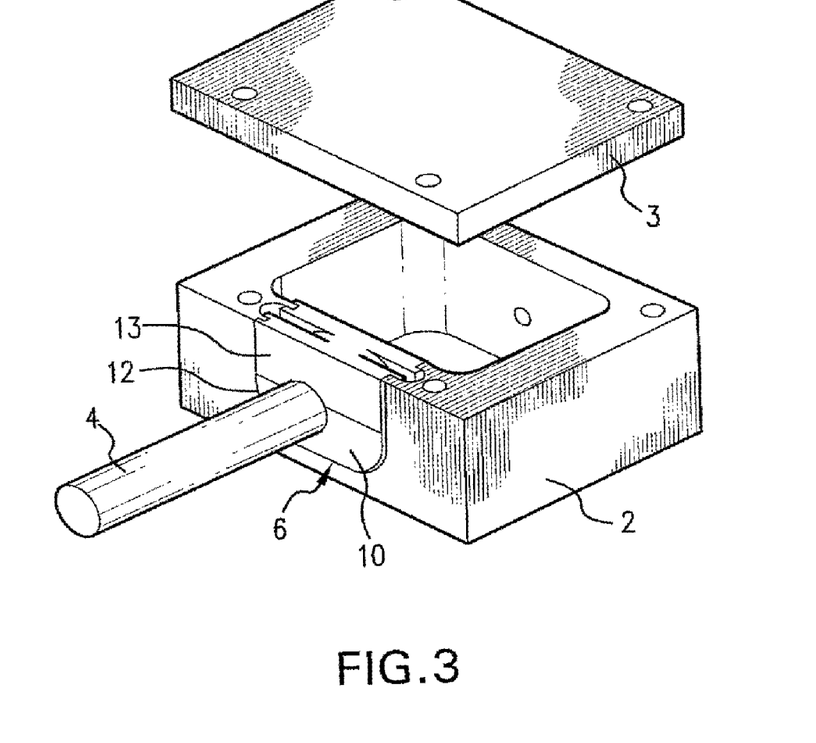
FIG. 3 is a perspective view illustrating the assembled sealing gasket and cable mounted in the housing with the lid member removed.

Referring first more particularly to FIGS. 1-3, the gasket seal means 10 of the present invention is operable to mount an electrical cable 4 within an opening 6 contained in the front wall 2a of a rigid housing 2. The housing 2, which may be formed of a metal or synthetic plastic material, includes a base portion 2 having vertical side walls 2a, 2b, 2c, and 2d and a bottom wall 2e that cooperate to define an open-topped chamber 54. A lid member 3 is fastened by screw fasteners (not shown) to the upper part of the base portion 2 to close the chamber 54. The circumferential surface of the wall opening 6 contains a groove 7 that divides the front wall 2a into a pair of wall portions 8 and 9. In accordance with a characterizing feature of the present invention, the gasket seal means 10 includes a pair of gasket sections 12 and 13 that are pivotally connected together by integral hinge means 60 in the form of a resilient connecting strip. Thus, as shown in FIG. 2, to mount the cable 4 in the wall opening 6, the sections 12 and 13 of the gasket seal means 10 are pivoted together toward an assembled condition about the electrical cable, whereupon the sealing gasket means 10 is inserted within the wall opening 6. The sections 12 and 13 of the gasket means 10 are formed from any suitable compressible electrically-insulating synthetic plastic material.

Figure 4:
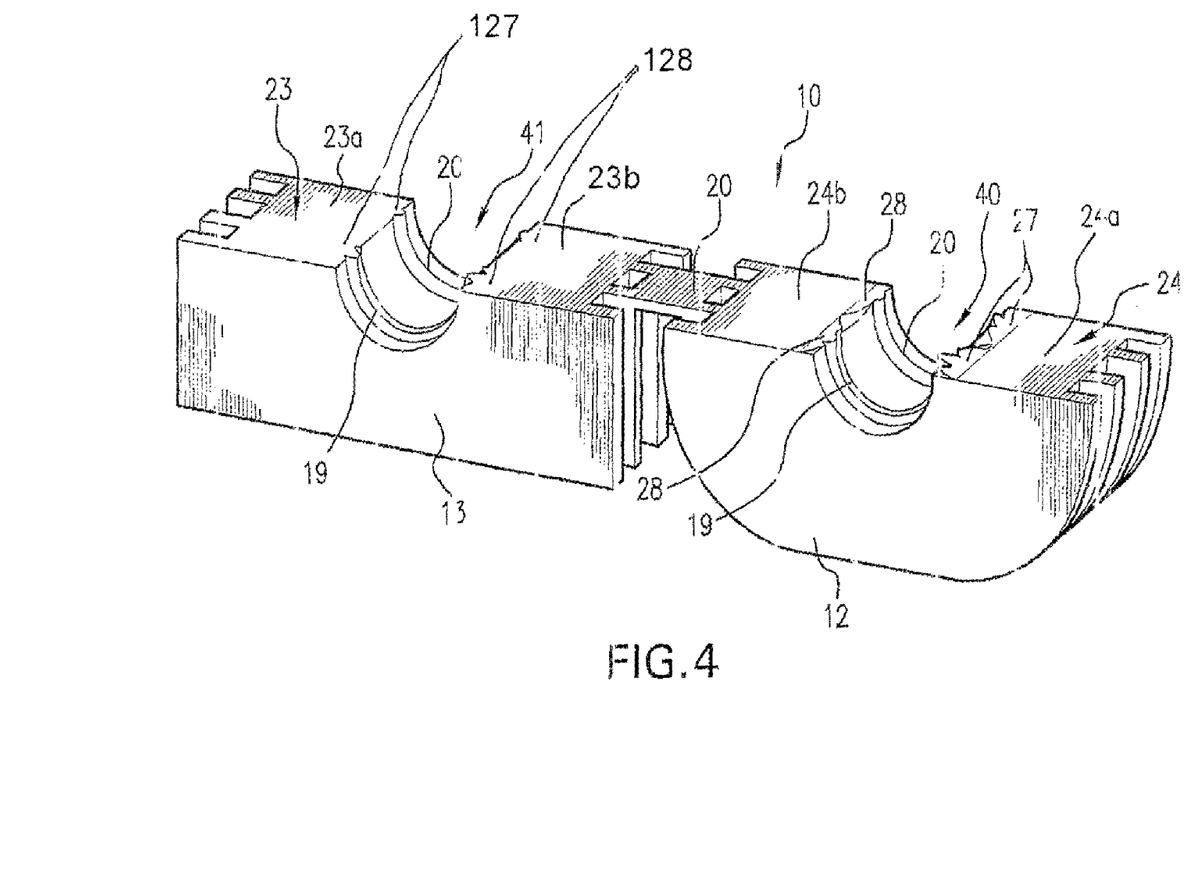
FIG. 4 is a perspective view of the sealing gasket when in the open disassembled condition.

Referring now to FIG. 4, in accordance with a characterizing feature of the present invention, the sections 12 and 13 of the sealing means 10 include planar surfaces 23 and 24 that contain semi-circular recesses 40 and 41 that are adapted to receive the electrical cable 4. On each side of the recess 40, the planar surface portions 24a and 24b are provided with upwardly projecting compressible projections 27 and 28. These compressible sealing projections are extensions of sealing ribs 19 and 20 that are arranged in laterally spaced relation and extend transversely completely across the inner circumferential surface of the recess 40. Similarly, integral sealing ribs 19 and 20 extend transversely across the recess 41. As shown in FIG. 4, the planar surfaces 23a and 23b of the gasket section 13 include imperforate portions 127 and 128 that are opposite the projections 27 and 28, respectively, when the hinged sections are pivoted together toward the assembled condition of FIG. 2. The outer circumferential surfaces of the gasket sections 12 and 13 are provided with a pair of continuous grooves 15 and 16 that receive the aforementioned wall portions 8 and 9 (FIG. 1) of the housing front wall 2a when the assembled sealing gasket means 10 is mounted in the wall opening 6, as shown in FIG. 3.

Figure 5:
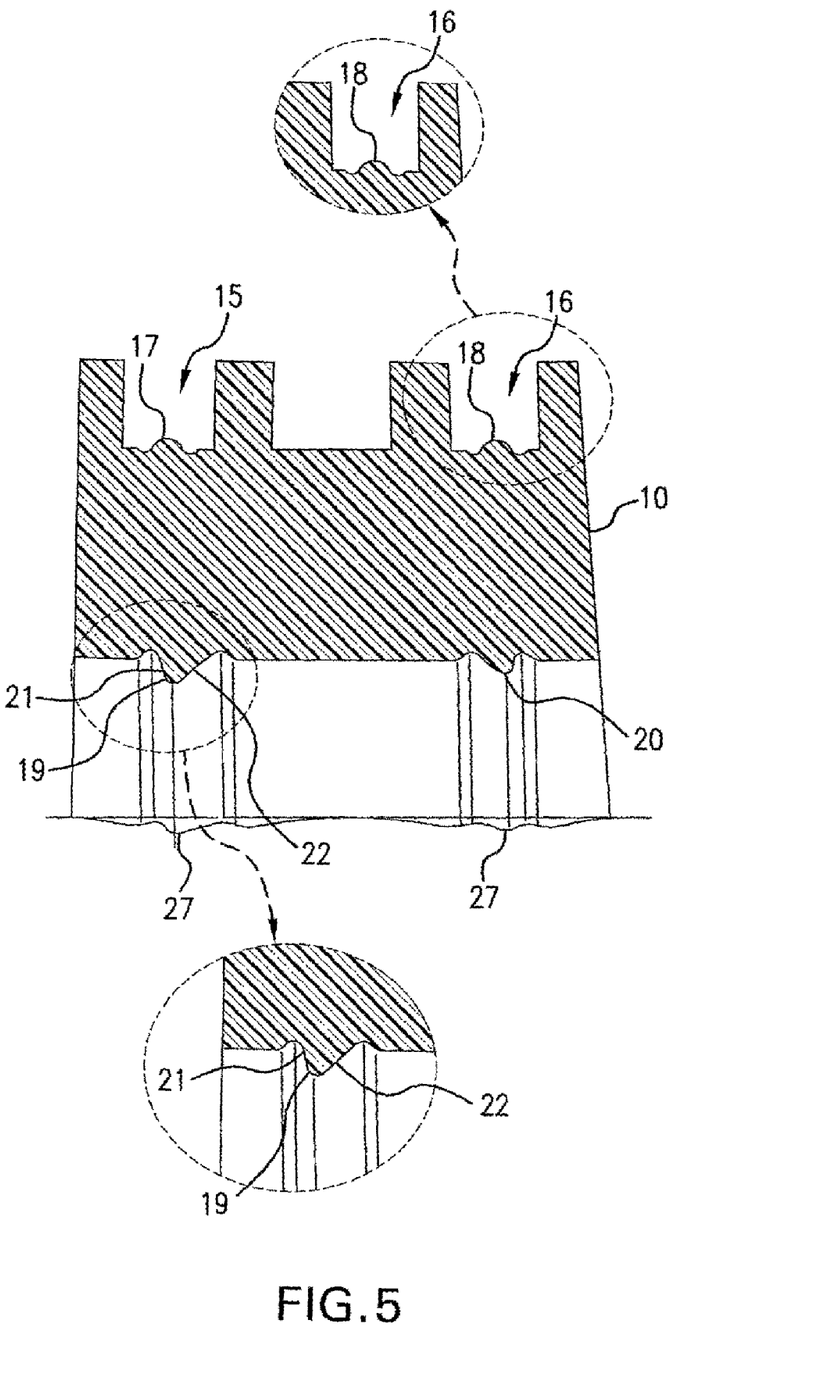
FIG. 5 is a detained sectional view taken through one of the sealing gasket sections.

Referring now to FIG. 5, it will be seen that the internal sealing ribs 19 and 20 have a generally triangular cross-sectional configuration, thereby defining a pair of angularly arranged inclined surfaces 21 and 22. Thus, when the sealing ribs 19 and 20 are compressed upon the outer circumferential surface of the cable 4 when the gasket seal sections 12 and 13 are in the completely assembled condition, the angular surfaces 21 and 22 are displaced to effect a tight sealing engagement with the outer circumferential surface of the cable 4. It will be seen in FIG. 5 that the bottoms of the outer grooves 15 and 16 are provided with annular bulges 17 and 18 that further cooperate with the edges of the wall portions 8 and 9 to seal the wall opening 6.

Figure 6A:
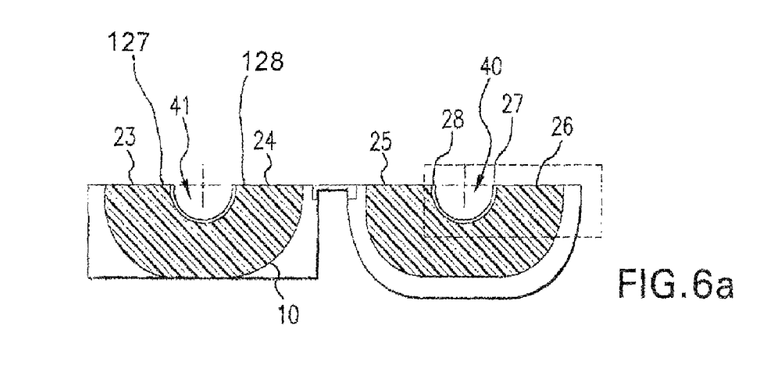
FIG. 6a is a sectional view taken through the sealing gasket when in the disassembled condition.
Figure 6B:
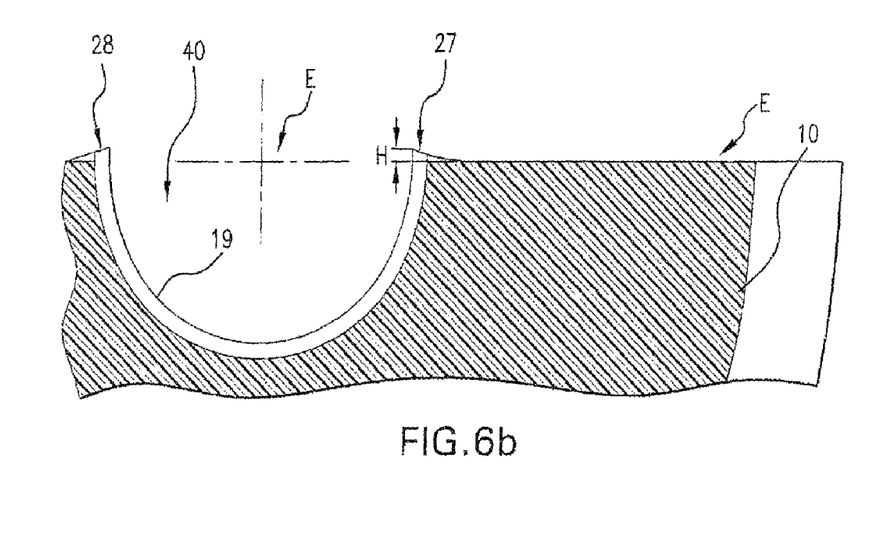
Figure 7:
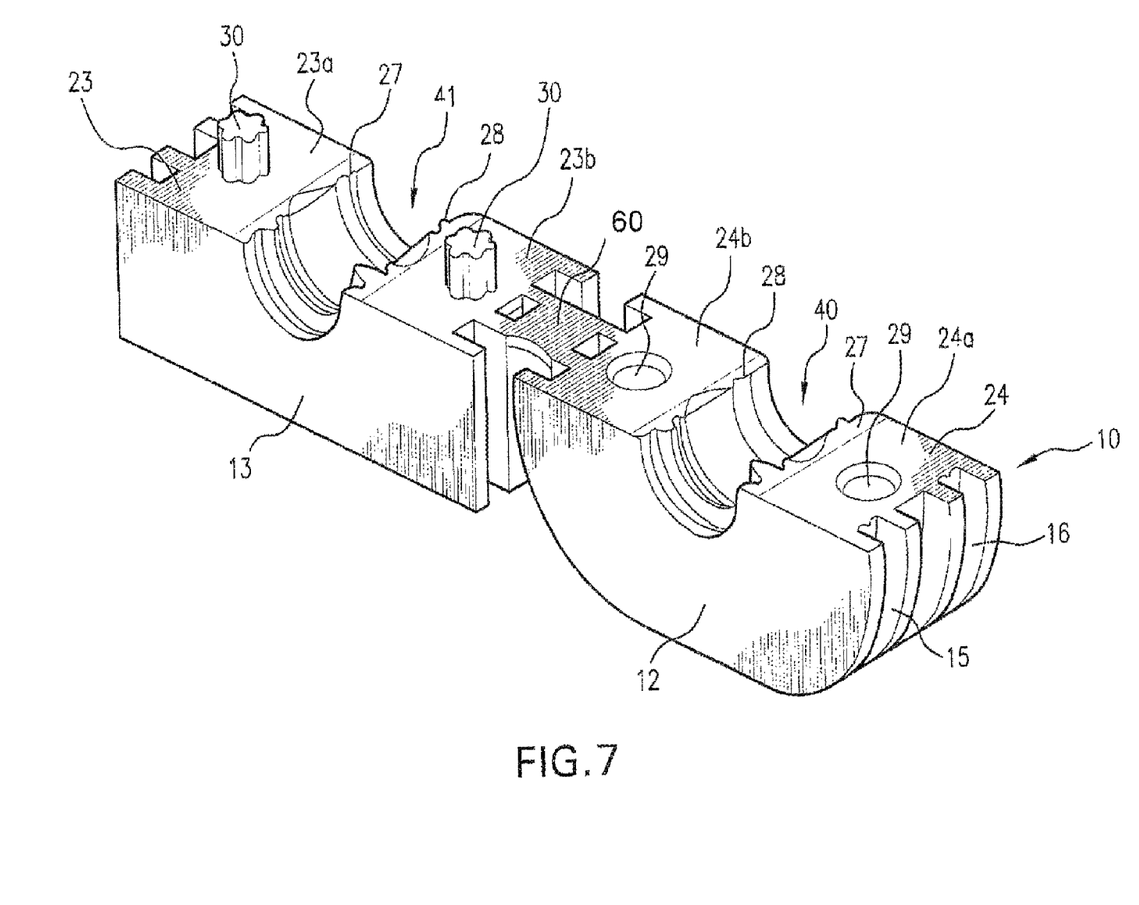
FIG. 7 is a perspective view illustrating a modification of the apparatus of FIG. 4 provided with fastening means for fastening together the sections.

Referring now to FIGS. 6a and 6b, it will be seen that the sealing projections 27 and 28 have a given height H adjacent the associated recess, which height progressively decreases as the compressible sealing projections 27 and 28 decrease away from the recess. Preferably, the maximum height H of the projection is greater than 0.5 mm, and preferably about 0.8 mm. These upwardly extending projections 27 and 28 are continuations of the internal sealing ribs 19 and 20 that extend transversally across the recess 40. Now the projections 27 and 28 have only been illustrated as being on the sealing section 12 in FIGS. 1-6, it will be apparent that similar projections could be provided on the section 13, as shown in FIG. 7. Preferably, the volume of projections 27 amounts to less than 0.01%, in particular, less than 0.005% of the total volume of gasket sections 12, 13.

According to FIGS. 4 to 6, projections 27 essentially are made in the area of the annular sealing ribs 19, 20 and extend not over the entire axial area—with respect to the extent of cable 4—of the inside circumference of gasket sections 12, 13. It is advantageous when the projections 27 axially in each case adjoin laterally to the sealing ribs 19, 20 and when their height rises to a maximum axially in the region of the sealing ribs 19, 20 because this contributes to a particularly optimal sealing effect and prevention of the effect deriving from the gap.

During assembly of the sealing gasket means, cable 4 is first of all placed in the recess contained in one of the gasket sections 12 (FIG. 1) and then the second gasket section 13 is folded over to the assembled condition of FIG. 2. The thus preassembled gasket arrangement is then placed within the wall opening 6 of front wall 2a.

The chamber in housing base 2 is now closed by the lid 3, whereby the gasket sections 12, 13 are pressed together to compress the projections 27 and 28 against the corresponding imperforate surfaces 127 and 128 on the gasket section 13, as well as to compress the sealing ribs 19 and 20. The formation of gaps that would normally impair the sealing effect can be prevented in a simple manner, especially toward the cable by means of a slight resultant material excess of the now compressed projections 27 and 28.

According to a structural feature of the invention, groove 7 becomes wider as it extends upwardly toward the upper edge (for example, it is conical toward the lid 3). The sealing body of the gasket sealing means 10 is made rounded below and laterally it is preferably entirely or essentially parallel, that is to say, it does not entirely follow the widening contour. If, therefore, after the assembly of the seal 10 the lid part 3 is now put on, then one gets the effect that the resilient lips or projections will be pressed upon the cable or conductor surface also from the side, something that has a supplementary advantageous effect.

The material excess of projections 27, 28 is so dimensioned that they can readily be compressed so far that one will not hinder the fact that the sealing segments 23-26 will lie directly upon each other in the assembled state.

In the modification shown in FIG. 7, the planar surfaces 23a and 23b of the gasket section 13 are in each case provided with fastening projections 30 that are arranged for fastening insertion into corresponding fastening bores 29 contained in the planar surfaces 24a and 24b of the other section gasket 12 when the gasket seal means is in the assembled condition so that seat and the coherence of the seal is optimized when in the folded-together assembled condition. This is advantageous during the prepackaging on the conductor because the seals are thus retained on the conductor. Moreover, this will center and simplify the assembly process. In this embodiment, the sealing projections 27 and 28 are provided on the planar surfaces of both of the gasket sections 12 and 13, whereby corresponding projections on the sections serve to compress each other.

Figure 8A:
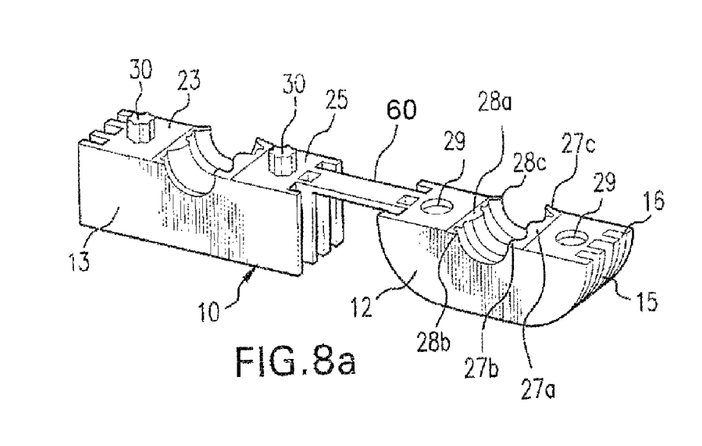
FIG. 8a is another perspective view of a modification of the sealing gasket of FIG. 7.
Figure 8B:
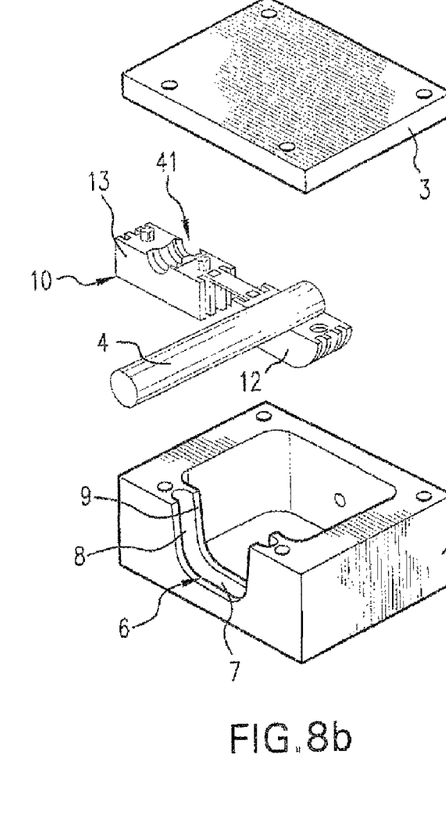
FIG. 8b is an exploded perspective view illustrating the manner of assembling the gasket of FIG. 8a within a wall opening.
Figure 8C:
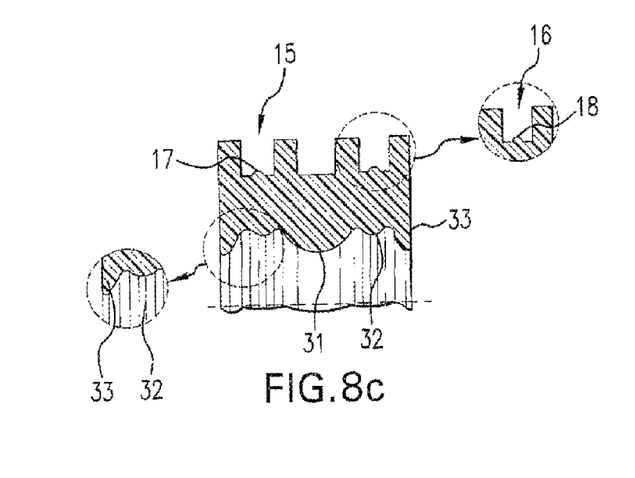

Referring now to the modification of FIGS. 8a-8c, likewise, there are provided on the two planar surfaces 23a and 23b of section 13 fastening projections 30 that are arranged to extend within corresponding fastening bores contained in the planar surfaces 24a and 24b of the gasket section 12. Moreover, the section surfaces 23a, 23b, 24a, 24b are furthermore provided toward the inside circumference again with projections 27, 28, whereby, in each case in an axial direction along the inside circumference in the middle area, there is provided a first projection 27a, 28a as a prolongation with a medial internal circumference annular rib 31 with a preferably flattened form, for example, a paraboloid form. Adjoining the medial annular bulge 31 furthermore to the side are smaller annular bulges 32 in an undulating fashion. They are adjoined laterally by these ultimately higher marginal annular ribs 33 adjacent two inside and outside front surfaces, which, in the area of the sealing section surfaces 23 and 24, again blend into projections 27b, 28b so that one gets a particularly advantageous combined sealing effect, especially also toward the front surfaces.

Here again, projections 27, 28 are made only or essentially only in the area of annular bulges 31 and 33 so that axially they will not extend over the entire area of the inside circumference of gasket sections 12, 13.

While in accordance with the provisions of the Patent Statutes the preferred forms and embodiments of the invention have been illustrated and described, it will be apparent to those skilled in the art that changes may be made without deviating from the invention described above.

What is claimed is:

1. Gasket seal means for supporting a cable (4) in the wall opening (7) of a housing (1), comprising:
   (a) a pair of generally rectangular gasket sections (12; 13) formed from a compressible material, each of said sections having a planar longitudinal surface (23; 24) containing a transverse recess (40; 41) extending completely thereacross;
   (b) the cross-sectional configurations of said recesses being such that when said sections a displaced from a disassembled condition toward an assembled condition in which said planar surfaces are in contiguous engagement and said recesses cooperate to define a gasket opening (50) having a cross-sectional configuration that corresponds generally with the cross-sectional configuration of the cable;
   (c) at least one of said gasket sections having on its said planar surface adjacent the associated recess an integral projection (27; 28) that extends toward the other gasket section;
   (d) the planar surface of the other of said gasket sections having imperforate portions (127, 128; 27, 28) that are opposite said projections when said sections are in said assembled condition, thereby to compress said projections to seal the spaces between said planar surfaces adjacent said recesses.

2. Gasket seal means as defined in claim 1, wherein said integral projection projects from said planar surface at a height (H) greater than 0.5 mm.

3. Gasket seal means as defined in claim 2, wherein said integral projection projects from said planar surface at a height (H) of about 0.8 mm.

4. Gasket seal means as defined in claim 1, wherein the total volume of the projections is less than 0.01% of the total volume of the two gasket sections.

5. Gasket seal means as defined in claim 4, wherein the total volume of the projections is less than 0.005% of the total volume of the two gasket sections.

6. Gasket seal means as defined in claim 1, wherein at least one projection (27; 28) extends upwardly from the planar surface of each gasket section adjacent each side of the recess contained therein.

7. Gasket seal means as defined in claim 6, wherein the recess of each gasket section includes on its circumferential surface at least one integral circumferential sealing rib (19; 20) that extends transversely of, and continuously completely across, the recess.

8. Gasket seal means as defined in claim 7, wherein said integral projection (27; 28) is integral with, and a continuation of, said sealing rib (19; 20).

9. Gasket seal means as defined in claim 8, wherein each projection (27; 28) has tapered generally triangular cross-sectional configuration with the height (H) of the projection progressively decreasing in the direction away from the associated recess.

10. Gasket seal means as defined in claim 6, wherein two of said sealing ribs (19; 20) are provided in spaced relation in each of said recesses, said sealing ribs being compressed into sealed supporting engagement with the peripheral surface of the cable when said gasket sections are in the assembled condition.

11. Gasket seal means as defined in claim 10, wherein each of said sealing ribs (19; 20) has a triangular cross-sectional configuration that defines a pair of inclined surfaces (21; 22) having different angles of inclination relative to the axis of the associated recess.

12. Gasket seal means as defined in claim 1, wherein said recesses (40; 41) have semicircular cross-sectional configurations extending through 180°.

13. Gasket seal means as defined in claim 1, and further including and integral hinge strip (60) connecting said gasket sections for pivotal movement between said assembled and disassembled conditions.

14. Gasket seal means as defined in claim 1, and further including fastening projection means (30) carried by the planar surface (23) of one gasket section for engagement within corresponding fastening bore means (29) contained in the planar surface (24) of the other gasket section.

15. Gasket seal means as defined in claim 1, wherein said gasket sealing means is formed from a compressible electrically-insulating material; and further including:
   (e) a hollow rectangular housing (1) having a bottom and side walls defining a chamber (54) wall, and a removable lid member (3) cooperating with said side walls to close said chamber, one of said side walls (5) containing a wall opening (6) in which said gasket seal means, in the assembled condition, is mounted,
      (1) said wall opening having a circumferential surface containing a wall groove (7) defining a pair of spaced wall portions (8 and 9);
      (2) at least a portion of the outer circumferential surface of said gasket means, when in the assembled condition, containing a pair of spaced outer gasket grooves (15; 16) receiving said housing opening wall portions, respectively.

16. Gasket seal means as defined in claim 15, wherein the width of said wall groove (7) progressively increases in the direction from said bottom wall toward said lid member.

17. Gasket seal means as defined in claim 16, wherein the width of said wall groove (7) progressively widens in a conical manner in the direction of said lid member.

18. Gasket seal means as defined in claim 15, wherein said outer gasket grooves (15; 16) have bottom walls provided with continuous sealing bulges (17; 18) that extend longitudinally thereof.

* * * * *